(12) United States Patent
Braconnier et al.

(10) Patent No.: US 9,102,998 B2
(45) Date of Patent: *Aug. 11, 2015

(54) METHOD OF RECOVERING RARE EARTHS FROM A SOLID MIXTURE CONTAINING A HALOPHOSPHATE AND A RARE EARTH COMPOUND AND SOLID MIXTURES SUITABLE FOR THIS METHOD

(75) Inventors: Jean-Jacques Braconnier, Andilly (FR); Alain Rollat, Paris (FR)

(73) Assignee: RHODIA OPERATIONS, Aubervilliers (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/981,306

(22) PCT Filed: Jan. 19, 2012

(86) PCT No.: PCT/EP2012/050810
§ 371 (c)(1),
(2), (4) Date: Sep. 25, 2013

(87) PCT Pub. No.: WO2012/101038
PCT Pub. Date: Aug. 2, 2012

(65) Prior Publication Data
US 2014/0023571 A1  Jan. 23, 2014

(30) Foreign Application Priority Data

Jan. 25, 2011 (FR) .................. 11 00213

(51) Int. Cl.
| | | |
|---|---|---|
| *C22B 59/00* | (2006.01) | |
| *C01F 17/00* | (2006.01) | |
| *C09K 11/01* | (2006.01) | |
| *H01J 9/52* | (2006.01) | |

(52) U.S. Cl.
CPC ............ *C22B 59/00* (2013.01); *C01F 17/0068* (2013.01); *C01F 17/0075* (2013.01); *C09K 11/01* (2013.01); *H01J 9/52* (2013.01)

(58) Field of Classification Search
None
See application file for complete search history.

(56) References Cited

U.S. PATENT DOCUMENTS

| 2009/0162267 A1 | 6/2009 | Otto et al. |
| 2012/0070351 A1 | 3/2012 | Braconnier et al. |

FOREIGN PATENT DOCUMENTS

| CN | 101205466 A | * | 6/2008 |
| DE | 27 41 987 A1 | | 3/1979 |
| DE | 199 18 793 A1 | | 11/2000 |
| EP | 0 157 249 A1 | | 10/1985 |
| FR | 2 944 276 A1 | | 10/2010 |
| JP | 01279702 A | * | 11/1989 |
| WO | 2007/141177 A1 | | 12/2007 |

OTHER PUBLICATIONS

Wojtalewicz-Kasprzak, "Erzeugung von synthetischen Selten-Erd-Konzentraten aus Leuchtstoffabfällen," Apr. 2007, Retrieved from the Internet, URL: http://d-nb.info/986092983/34 on Jun. 7, 2012.
Rabah et al., "Recyclables recovery of europium and yttrium metals and some salts from spent fluorescent lamps," Waste Management, 2008, pp. 318-325, vol. 28.
Hirajima et al., "Feasibility of an efficient recovery of rare earth-activated phosphors from waste fluorescent lamps through dense-medium centrifugation," Separation and Purification Technology, Aug. 2005, pp. 197-204, vol. 44.
International Search Report issued on Jun. 18, 2012, by the European Patent Office as the International Searching Authority in corresponding International Application No. PCT/EP2012/050810.

* cited by examiner

*Primary Examiner* — Melissa Swain

(57) ABSTRACT

An acid treatment, in a liquid medium, of a solid containing a halophosphate and a rare earth compound is described. Further described, is the addition of a base to the medium obtained previously and separation of a solid phase from a liquid phase; mixing and calcination of the solid obtained previously with an alkaline solid compound; redispersing the calcined product in water, separation of the solid product from the suspension obtained in the preceding step; dispersing this solid in water and acidification of the dispersion and separation of the solid from this dispersion.

4 Claims, No Drawings

METHOD OF RECOVERING RARE EARTHS FROM A SOLID MIXTURE CONTAINING A HALOPHOSPHATE AND A RARE EARTH COMPOUND AND SOLID MIXTURES SUITABLE FOR THIS METHOD

CROSS-REFERENCE TO PRIOR APPLICATIONS

This application is a National Stage of PCT/EP2012/050810, filed Jan. 19, 2012, and designating the U.S.(published in French on Aug. 2, 2012, as WO 2012/101038 A1), which claims priority under 35 U.S.C. §119 to FR 1100213, filed Jan. 25, 2011, each hereby expressly incorporated by reference in its entirety and each assigned to the assignee hereof.

The present invention relates to a method of recovering rare earths from a solid mixture containing a halophosphate and a compound of one or more rare earths as well as a solid mixture that is particularly suitable for said method.

The market for energy-saving lamps is now expanding rapidly. It is known that lighting is in fact a major item in the energy bill of the industrialized countries and that the use of these lamps instead of incandescent lamps will make it possible to reduce the energy bill.

Government directives issued in several countries will increase this trend towards energy-saving lamps.

Furthermore, development of lamps of this type makes it essential to manage their recovery and recycling, taking into account not only the presence of mercury, but also of the metals included in their composition.

Recycling of the lamps comprises a first step of dismantling them. In the particular case of tubes, dismantling can be carried out by a so-called "end cut" method in which the ends of the tubes are cut off and the fluorescent powders, which comprise one or more luminophores as well as additives for improving lamp performance (alumina, calcium phosphate or borate etc.), are recovered by blowing. Another method, usable for any type of lamp, consists of grinding the lamps, and sieving the ground product for at least partial removal of the glass and metals. A powder is also obtained, which contains the luminophores and additives mentioned above.

There is therefore a great need for a method for separating the various components of these powders so that they can then be recycled separately.

The method of the invention meets this need.

With this aim, the method of the invention, for recovery of rare earths from a solid mixture containing at least one halophosphate and at least one compound of one or more rare earths, is characterized in that it comprises the following steps:
 (a) carrying out acid treatment of said mixture in a liquid medium;
 (b) a base and the medium obtained after step (a) are put together so as to raise the pH of said medium to a value of at least 1.5, by which a first solid phase is obtained comprising one or more rare earths at least partly in the form of phosphate and a first liquid phase comprising at least one alkaline-earth element of the halophosphate and the first solid phase is separated from the first liquid phase;
 (c) the solid mixture from step (b) is mixed with an alkaline solid compound and the resultant mixture is calcined;
 (d) the calcined product from the preceding step is redispersed in water;
 (e) a second solid phase comprising one or more rare earths at least in the form of hydroxide and a second liquid phase comprising at least one alkaline element are separated from the suspension obtained at the end of the preceding step;
 (f) the solid from the preceding step is dispersed in water and the resultant suspension is acidified;
 (g) a third solid phase and a third liquid phase comprising at least one rare earth salt are separated from the suspension obtained at the end of the preceding step.

The invention further relates to a solid mixture that is particularly suitable for the method that has just been described.

This mixture according to the invention, which comprises at least one halophosphate and at least one compound of one or more rare earths and which results from treatment for the recycling of lamps by grinding, is characterized in that it is in the form of a powder with grain size below 40 µm and in that its silica content is at most 10%.

Other characteristics, details and advantages of the invention will become clearer on reading the description given below as well as a concrete but non-limiting example intended to illustrate the invention.

For the present description, rare earth means the elements of the group consisting of yttrium and the elements of the periodic table with atomic number between 57 and 71 inclusive.

It is also stipulated for the rest of the description that, unless stated otherwise, in all the ranges or limits of values that are given, the values at the limits of the ranges are included, so that the ranges or limits of values thus defined therefore cover any value at least equal to and greater than the lower limit and/or at most equal to or less than the upper limit.

Moreover, the calcinations for a given temperature and duration correspond, unless stated otherwise, to calcinations in air at a temperature level for the stated duration.

The method of recovery of the invention starts from a mixture in solid form which notably contains at least one halophosphate and at least one compound of one or more rare earths.

The method of the invention can be applied particularly well to a mixture notably containing luminophores and which results from a treatment for recovery or recycling of lamps, for example fluorescent tubes, linear, compact, trichromatic or halogen lamps, said treatment having previously recovered, at least partly, materials such as glass, mercury or other metals.

This mixture is generally in the form of a powder with a granulometry that can vary over a wide range and which can notably be between 0.5 µm and 40 µm, more particularly between 3 µm and 15 µm and the specific gravity of which can be for example between 3 and 5. The granulometry is measured here, and for all of the description unless stated otherwise, by scanning electron microscopy (SEM).

A first type of halophosphate that may be present in the starting mixture is a luminophore used in lamps for its white emission colour. It is generally a compound of the apatite type, i.e. a compound which is a mixture of a calcium phosphate and another salt of this element and which can also comprise halogens such as fluorine or chlorine. We may mention as examples hydroxyapatite $Ca_{10}(PO_4)_6(OH)_2$, chloroapatite $Ca_3(PO_4)_2CaCl_2$, fluoroapatite $Ca_5(PO_4)_3F$. As is known, the compounds of this type can further comprise another alkaline-earth element such as strontium, partially replacing the calcium, doping elements of the transition element type such as antimony or manganese or of the rare earth type. As an example, we may mention a compound represented by the general formula $(Sr, Ca)_{10}(PO_4)_6(Cl,F)_2$: $Sb^{3+}$, $Mn^{2+}$.

As another type of halophosphate, we may mention the products of the phosphate type comprising a halogen, an alkaline-earth element and a rare earth such as europium for example. We may mention, as an example of a compound of this type, the compound of formula $Sr_5(PO_4)_3Cl:Eu^{2+}$. These halophosphates are generally used for their blue emission colour.

The solid starting mixture further comprises at least one compound of one or more rare earths.

These compounds can be of various kinds. They can be selected more particularly from the phosphates, alkaline-earth aluminates, borates, vanadates and the oxides of rare earths.

For the phosphates we may mention more particularly the phosphates of cerium or of terbium or of a combination of these two rare earths. They can also be phosphates of lanthanum in combination with at least one of the two aforementioned rare earths and they can also be, quite particularly, phosphates of lanthanum, of cerium and of terbium. These phosphates are generally orthophosphates, which can be represented by the general formula $LnPO_4$, where Ln denotes at least one rare earth such as lanthanum, cerium and terbium. These are notably luminophores used for their emission in the green.

For the aluminates, they are alkaline-earth aluminates, and the alkaline earth can more particularly be magnesium, barium, calcium or strontium, used alone or in combination. These are generally products used in lamps for their emission in the blue or green.

The rare earth, which can be present as element of the matrix or as dopant, can notably be cerium, terbium, europium, neodymium and dysprosium, and these elements can be used alone or in combination.

For these products, barium can be replaced partially with at least one element selected from strontium, calcium or rare earths other than europium. Moreover, magnesium can be replaced partially with at least one element selected from zinc or manganese or cobalt. Finally, aluminium can also be replaced partially with at least one element selected from gallium, scandium, boron, germanium or silicon.

As an example only, we may mention aluminates with the following formulae: $BaMgAl_{10}O_{17}:Eu^{2+}$ or $(Ce,Tb)MgAl_{11}O_{19}$. The borates of rare earths can be orthoborates of formula $LnBO_3$, with Ln representing at least one rare earth, or rare earth oxyborates of formula $Ln_3BO_6$. It is known that in these borates the rare earth can be present as an element of the matrix of the borate, and in this case the rare earth can notably be lanthanum, lutetium, yttrium and gadolinium or a combination of at least two of these rare earths but also as a doping element. In the latter case, the rare earth can more particularly be europium, samarium, thulium and ytterbium, and these elements can be used alone or in combination. The rare earth dopant can also be present in combination with a second dopant such as bismuth, lead, antimony, chromium and iron.

A product of formula $(Gd,Mg)B_5O_{10}:Ce^{3+},Tb^{3+}$ can be given as an example of borate.

The rare earths can also be present in the form of vanadates, doped with a rare earth such as europium. We may thus mention the compounds $YVO_4:Eu$ or $Y(P,V)O_4:Eu$.

Finally, the rare earth compound in the starting mixture can be a rare earth oxide of general formula $Ln_2O_3$. We may mention more particularly yttrium oxide ($Y_2O_3$) or gadolinium oxide ($Gd_2O_3$) or the mixed oxide of yttrium and gadolinium ($(Y,Gd)_2O_3$). These oxides of yttrium and/or of gadolinium are generally doped with europium and they can optionally contain other additional elements selected from the rare earths other than europium, gadolinium and yttrium. We may notably mention terbium, samarium or lanthanum. These oxides are generally used in lamps for their red emission.

The solid starting mixture can additionally contain compounds such as alumina $Al_2O_3$, silica $SiO_2$, calcium phosphates and other residues resulting from treatment of the lamps, for instance metals such as mercury or plastics or glass fragments.

The respective proportions of halophosphate and of compounds of rare earths can vary widely depending notably on the type of lamp from which the mixture to be treated was obtained. The method of the invention can be applied quite particularly to mixtures that have a content of at most about 80 wt. % of halophosphate, but this value is not critical and is only given as an example.

The different steps of the method of the invention will now be described in more detail.

The first step of the method of the invention, step (a), is an acid treatment of the solid mixture that has just been described.

This treatment is carried out in a liquid medium. Thus, the solid mixture can be suspended in water and the resultant suspension can be brought into contact with an acid. This can be carried out in a stirred reactor containing the suspension, introducing a solution of acid into the reactor.

According to a preferred variant, the acid is a strong acid. According to another variant that is even more preferred, a strong acid other than sulphuric acid is used, for example nitric acid or hydrochloric acid. The acid treatment is preferably carried out hot, for example at a temperature between 30° C. and 90° C. and more particularly between 40° C. and 80° C.

Generally the treatment is carried out until a pH of less than or equal to 1 is obtained in the reaction mixture.

Once the pH has been reached, after adding the necessary amount of acid it may be advantageous to let the reaction mixture mature, by maintaining it in the same conditions of pH and temperature as those prevailing at the end of the treatment, optionally with stirring.

The second step of the method, step (b), consists of putting a base and the medium obtained at the end of step (a) together, generally by adding the base to said medium, optionally maintaining the medium at the same temperature as it had before introduction of the base.

A base of the alkali metal hydroxide type, such as soda, is preferably used. Bringing in contact with the base or addition of the latter is carried out in such a way that the pH of the reaction mixture rises to a pH of at least 1.5 and preferably of at most 2.

After bringing in contact with the base or addition of the latter, the medium obtained can be submitted to a thermal treatment or maturation which consists of maintaining the medium at a temperature which can be for example at least 40° C., optionally with stirring.

After bringing in contact with the base or addition of the latter, optionally after maturation and, preferably, after cooling of the reaction mixture, the phases of the reaction mixture are separated by any suitable method of solid/liquid separation, for example filtration, centrifugation, decanting.

At the end of this separation, a first solid phase and a first liquid phase are collected. Washing of the solid phase with water can be carried out.

The first solid phase comprises the rare earth(s) of the solid starting mixture. This rare earth or these rare earths are at least partly in the form of phosphate, notably orthophosphate. The solid phase can in fact contain one or more rare earths in another form, for example in the form of aluminates and, optionally, and in residual amounts, borates or oxides, depending notably on the composition of the solid starting mixture, these forms corresponding to the rare earth compounds that were not attacked during the first step of acid treatment. Finally, this solid phase can additionally contain other compounds such as alumina or silica.

The first liquid phase comprises at least one alkaline-earth element, which is the alkaline earth of the starting halophosphate, notably calcium or strontium, in the form of a solution, generally aqueous, of the salt of the acid used during the acid treatment.

The next step of the method, step (c), is a step of solid/solid reaction (alkaline fusion) in which the solid from step (b) is mixed with an alkaline compound, which can be for example a hydroxide, such as NaOH, an oxide such as $Na_2O$, and more particularly a carbonate, even more particularly a sodium carbonate. Mixing is effected with a proportion by weight of alkaline compound generally in excess relative to the solid for an optimum reaction, and said proportion can be for example at least 2 parts of alkaline compound to 1 part of solid and can notably be up to 5 parts of alkaline compound to 1 part of solid (part by weight).

Calcination is carried out in an oven at a sufficient temperature to obtain fusion of the mixture, for example at a temperature of at least 700° C., preferably of at least 800° C. and even more particularly of at least 900° C. Purely as an example, the duration of this calcination can be between 1 and 4 h.

After calcination, the solid obtained is cooled and, in a next step of the method, step (d), it is dispersed in water, preferably with stirring, so as to obtain a suspension.

Once again, the suspension can also undergo a thermal treatment or maturation, maintaining the suspension at a temperature which can be for example at least 60° C., preferably with stirring.

The solid and liquid phases of the suspension are then separated, (step (e)), by any known means, notably by filtration, thus obtaining a second solid phase and a second liquid phase.

The solid phase, which can be washed with water, contains one or more rare earths, which are generally present in the form of hydroxides $Ln(OH)_3$, as well as residues of the alumina or silica type (Ln denoting a rare earth in the sense given above).

The liquid phase comprises an alkaline element, which is that of the solid compound used in step (c), said alkaline element generally being in the form of a hydroxide for example NaOH, an aluminate for example $NaAlO_2$ or a silicate such as $Na_2SiO_3$.

In order to recover the rare earth(s) contained in the solid residue resulting from step (e) (second solid phase), this solid is dispersed in water and the resultant suspension is acidified (step (f)).

A strong acid, for example nitric acid or hydrochloric acid, can be used for this acidification. Acidification is carried out by adding the acid until the pH of the reaction mixture is below 7, preferably at most 3, for example equal to 0.

When nitric acid is used, in order to improve the yield in recovery of rare earths it is possible to add hydrogen peroxide as well to the reaction mixture, notably at the same time as the acid, in an amount that can give a molar ratio $H_2O_2/HNO_3$ generally of at least 0.5 for example, as a lower ratio can affect the effectiveness of the hydrogen peroxide, whereas the upper value is only limited by the economics of the process.

Once again it is possible for the suspension obtained after acidification to undergo a thermal treatment or maturation by maintaining said suspension at a temperature that can be for example at least 60° C., preferably with stirring.

The solid and liquid phases of the medium obtained are then separated, step (g), by any known means, notably by filtration, giving a third solid phase and a third liquid phase.

The solid phase recovered contains species that were not attacked, for example alumina or silica.

The liquid phase constitutes the product of the method of recovery of the invention since it contains the rare earth(s) present in the solid starting mixture. In the case of a mixture of rare earths, they can be separated by known methods of the liquid/liquid extraction type.

The invention also relates to a solid mixture which is particularly suitable for the method described above and consequently it relates to the method in which step (a) is performed on this solid mixture.

This mixture will be described in more detail below.

This mixture comprises at least one halophosphate and at least one compound of one or more rare earths.

What was said above concerning the composition of the mixture that can be treated by the method of the invention also applies here with regard to the types of halophosphate, the rare earth compounds, the compounds such as alumina $Al_2O_3$, silica $SiO_2$, calcium phosphates and other residues and the proportions of halophosphate and of rare earth compounds.

The mixture of the invention can notably contain at least one compound of a rare earth of the group comprising terbium, yttrium and europium.

The mixture is in the form of a powder.

It is moreover a mixture obtained after a treatment for the recycling of lamps by grinding. This treatment corresponds to that mentioned above, in which any type of lamp is submitted to grinding and a powder is obtained with particle size varying over an extremely wide range, which can be for example between about 0.5 μm for the lower limit and several mm, for example between 5 mm and 10 mm for the upper limit. It should be noted here that the invention does not apply to a powder obtained by blowing as a result of a method of the "end cut" type as described above in the introduction of the description.

According to a main characteristic of the mixture of the invention, the powder constituting said mixture has a grain size below 40 μm. This notably means that the powder passes through a 40 μm sieve. The particles of which the powder is constituted can nevertheless have average sizes below 40 μm or can be distributed in several populations with different average sizes.

Furthermore, and according to another characteristic of the mixture of the invention, it has a silica content of at most 10%, said content being expressed as the weight of silica ($SiO_2$) relative to the total weight of the mixture.

More particularly, the mixture of the invention can have a silica content of at most 8% and even more particularly of at most 2%.

The silica content is measured in a known way by X-ray fluorescence.

Moreover, the mixture can have a CaO content of at most 35%, more particularly of at most 25%.

The mixture is obtained by a method in which the lamps are first submitted to a grinding operation and then a first dry sieving or screening of the ground product using a 200 μm sieve. The undersize from this first sieving then undergoes a second sieving at 40 μm. This second sieving can be a dry sieving or, preferably, wet sieving, the powder to be sieved being made in this case into an aqueous suspension.

The silica content can be adjusted by varying the grinding conditions before the first sieving at 200 µm, as coarser grinding leads to a final powder with a lower silica content than in the case of finer grinding.

Solid mixtures having the characteristics of granulometry and silica content that have just been given allow easier application of the method of the invention, notably the separation of the solid phase from the liquid phase in step (g) takes place in better conditions.

An example will now be given, which relates to a mixture according to the invention and a method, also according to the invention, which employs said mixture.

EXAMPLE

The following reagents are used for this example:
Hydrochloric acid 37%, specific gravity 1.18
Normapur soda pellets
Sodium Carbonate $Na_2CO_3$ $10H_2O$ Normapur
Nitric acid 69% specific gravity 1.41
Hydrogen peroxide 70% (300v)
Preparation of the Starting Mixture First, a mixture according to the invention is prepared from a starting powder resulting from the grinding of lamps. This powder is heterogeneous, and coarse; it contains glass fragments that can reach a size of several millimeters.

The powder undergoes a first sieving at 200 µm, which removes the glass fragments. The granulometry of the undersize powder obtained has two populations. The portion of the powder containing the luminophores has a granulometric distribution centred on 10-20 µm, whereas the particles of ground glass have a granulometric distribution centred on 40 µm.

A second sieving, on a 40 µm sieve, in a wet medium, is carried out and leads to an undersize or mixture with the composition given in Table 1 below.

It should be pointed out that for the composition tables given below, the amounts of the elements are stated as oxide equivalent, which does not mean that the elements in question are necessarily in the form of oxide. The percentages shown in the tables are to be understood as the weight of oxide equivalent relative to the total weight of the starting mixture or of the cake obtained at the end of the different steps.

TABLE 1

| element | % |
|---|---|
| BaO | 3 |
| $Eu_2O_3$ | 2 |
| MgO | 1.3 |
| $Tb_4O_7$ | 1.6 |
| $P_2O_5$ | 20 |
| $Gd_2O_3$ | 2.0 |
| $SiO_2$ | 2.0 |
| $CeO_2$ | 3.0 |
| $Y_2O_3$ | 24.0 |
| $La_2O_3$ | 4.0 |
| $Al_2O_3$ | 13.0 |
| CaO | 22.0 |
| MnO | 0.6 |
| SrO | 0.6 |
| $Sb_2O_3$ | 0.4 |

Procedure
The procedure is as follows:
Pour 1100 ml of distilled water into a glass beaker equipped with a system for stirring. While stirring, add 200 g of the mixture prepared above in the form of dry powder.

Then heat the mixture to 40° C., stirring continuously.
Then add hydrochloric acid HCl to pH 0.
Then leave the mixture to mature for 15 min, maintaining it at 40° C., with stirring.
Then, stirring continuously at constant temperature, add a 4N solution of soda NaOH until the pH is equal to 2.
Leave the mixture to mature for 20 minutes at 40° C., with stirring.
Filter hot, on a Büchner.
The cake obtained is then washed on the Büchner and finally dried at 40° C. in a ventilated stove.
After this step of acid treatment, the cake obtained has the composition presented in Table 2 below.

TABLE 2

| element | % |
|---|---|
| BaO | 5 |
| $Eu_2O_3$ | 3 |
| MgO | 2 |
| $Tb_4O_7$ | 3 |
| $P_2O_5$ | 6 |
| $Gd_2O_3$ | 3 |
| $SiO_2$ | 3.0 |
| $CeO_2$ | 5.0 |
| $Y_2O_3$ | 40.0 |
| $La_2O_3$ | 8.0 |
| $Al_2O_3$ | 21.0 |
| CaO | 0.50 |

The dried cake, after the acid treatment, is first ground in a mortar, then mixed with sodium carbonate $Na_2CO_3$ in a weight ratio $Na_2CO_3$/powder of 3.

This mixture is then ground intimately and is put in crucibles made of alumina.

These crucibles, not covered, are put in an oven heated to 950° C., and are calcined for 4 hours.

The solid obtained after cooling is ground and then suspended in 1000 mL of water, in a beaker with a concentration of 140 g powder/liter.

This suspension is then heated at 75° C. for 3 hours, with stirring, and then filtered hot on a Büchner. The solid filter cake is washed with distilled water.

The cake obtained is then resuspended in 0.5 liter of distilled water and the suspension is heated at 75° C. with stirring.

Nitric acid $HNO_3$ is added until the pH is below 0 and at the same time hydrogen peroxide $H_2O_2$, in a molar ratio such that:

$H_2O_2/HNO_3=1$

The mixture obtained is left to mature for 1 h at 75° C., stirring continuously. Finally, the hot suspension is filtered on a Büchner.

The solution of nitrate of rare earths obtained (845 ml) has a concentration of 78 g/liter expressed in gram of equivalent oxides of rare earths.

The overall yield of the acid treatment, expressed as the ratio of the amounts of oxide equivalents of rare earths in the starting powder, to the amount recovered in the nitrate solution, is therefore at least 90%.

The invention claimed is:
1. A method of recovering rare earths from a solid mixture containing at least one halophosphate and at least one compound of one or more rare earths, the method comprising the following steps:
   (a) carrying out acid treatment of said mixture in a liquid medium having a pH;

(b) adding a base to the liquid medium so as to raise the pH of said liquid medium to a value of at least 1.5, thus obtaining a first solid phase comprising one or more rare earths at least partly as a phosphate and a first liquid phase comprising at least one alkaline-earth element of halophosphate and separating the first solid phase from the first liquid phase;

(c) mixing the first solid phase with an alkaline solid compound to form a resultant mixture and calcining the resultant mixture to form a calcined product;

(d) redispersing the calcined product in water to form a first resultant suspension;

(e) separating a second solid phase comprising one or more rare earths at least partially as a hydroxide and a second liquid phase comprising at least one alkaline element from the first resultant suspension;

(f) dispersing the second solid phase in water to form a second resultant suspension and acidifying the second resultant suspension; and (g) separating a third solid phase and a third liquid phase comprising at least one rare earth salt from the second resultant suspension.

2. The method as defined by claim 1, wherein a thermal treatment is carried out on at least one of:
the liquid medium after adding the base,
the first resultant suspension, or
the second resultant suspension after acidficiation.

3. The method as defined by claim 1, wherein the acid treatment in step (a) or the acidification in step (f) is carried out with nitric acid or hydrochloric acid.

4. The method as defined by claim 1, wherein step (a) is performed on a solid mixture comprising at least one halophosphate and at least one compound of one or more rare earths, which results from a treatment of recycling of lamps by grinding, wherein the solid mixture is in powder form having grain size below 40 μm and a silica content of at most 10% by weight, relative to the total weight of the solid mixture.

* * * * *